US008550525B2

(12) United States Patent
Hafner et al.

(10) Patent No.: US 8,550,525 B2
(45) Date of Patent: Oct. 8, 2013

(54) TOOL AND PROCESS FOR HANDLING PLIANT COMESTIBLES

(75) Inventors: Craig Hafner, Lutherville, MD (US); Anthony Scarcia, Lancaster, PA (US)

(73) Assignee: J.L. Souser & Associates, Inc., York, PA (US)

( * ) Notice: Subject to any disclaimer, the term of this patent is extended or adjusted under 35 U.S.C. 154(b) by 0 days.

(21) Appl. No.: 13/172,929

(22) Filed: Jun. 30, 2011

(65) Prior Publication Data

US 2013/0004286 A1   Jan. 3, 2013

(51) Int. Cl.
*B25J 15/06* (2006.01)
(52) U.S. Cl.
USPC .......................................... 294/188
(58) Field of Classification Search
USPC ............... 294/64.2, 65, 183, 188; 414/752.1; 269/20, 21
See application file for complete search history.

(56) References Cited

U.S. PATENT DOCUMENTS

| 2,811,990 | A | | 11/1957 | Vaniman et al. |
| 3,272,350 | A | * | 9/1966 | Pflaumer et al. ......... 414/416.01 |
| 3,472,356 | A | * | 10/1969 | Reppert ........................ 221/157 |
| 3,720,433 | A | * | 3/1973 | Rosfelder ..................... 294/188 |
| 4,185,814 | A | * | 1/1980 | Buchmann et al. ........... 271/108 |
| 4,527,783 | A | * | 7/1985 | Collora et al. ................. 269/21 |
| 5,098,332 | A | | 3/1992 | Handel |
| 6,341,769 | B1 | * | 1/2002 | Lin et al. ........................ 269/21 |
| 7,810,772 | B2 | * | 10/2010 | Sato et al. ................. 248/206.5 |

* cited by examiner

*Primary Examiner* — Stephen Vu
(74) *Attorney, Agent, or Firm* — McNees Wallace & Nurick LLC

(57) ABSTRACT

A tool and process for handling a pliant comestible are disclosed. The tool includes a tool body including a recessed mold and a plurality of cavities. The tool body is configured to position the pliant comestible and retain the pliant comestible within the recessed mold.

16 Claims, 3 Drawing Sheets

TOOL AND PROCESS FOR HANDLING PLIANT COMESTIBLES

FIELD OF THE INVENTION

The present invention is directed to tools and processes of handling products. More specifically, the present invention relates to tools and processes of handling pliant comestibles.

BACKGROUND OF THE INVENTION

In general, materials handling processes utilizing tools permit decreased contamination of comestibles, increased consistency of comestibles, increased quality control, and increased rates of production. These improvements can result in high profitability and/or safer products. However, known production and handling tools suffer from drawbacks.

Handling of pliant comestibles can damage the product by contacting the product with prongs and/or substantially planar surfaces thereby undesirably deforming the product. Such undesirable deforming can result in pliant comestibles being inconsistent in shape, can decrease the number of quality products produced, and/or can decrease the rate of production of pliant comestibles.

This undesirable deformation is especially problematic for pliant comestibles being cooked. Pliant comestibles that are being cooked can be heated unevenly due to material handling tools and/or can be shaped in an undesirable manner due to the inconsistency of force applied to the pliant comestible.

What is needed is a tool and process for handling pliant comestibles that is capable of handling the pliant comestibles without damaging the product.

SUMMARY OF THE INVENTION

An aspect of the present invention includes a tool for handling a pliant comestible. The tool includes a tool body comprising a recessed mold and a plurality of cavities. The tool further includes a plurality of collapsible suction devices configured to be positioned within the plurality of cavities. The plurality of collapsible suction devices are configured to lift the pliant comestible, collapse into the plurality of cavities, and position the pliant comestible within the recessed mold.

Another aspect of the present invention includes a tool for handling a pliant comestible. The tool includes a tool body including a recessed mold and a plurality of cavities. The tool body is configured to position the pliant comestible and temporarily retain the pliant comestible within the recessed mold.

Another aspect of the present invention includes a process for handling a pliant comestible. The process includes providing a tool including a tool body and a plurality of collapsible suction devices, lifting the pliant comestible with the plurality of collapsible suction devices, collapsing the plurality of collapsible suction devices into a plurality of cavities of the tool body, and positioning the pliant comestible within a recessed mold of the tool body. The tool body includes the recessed mold and the plurality of cavities, the plurality of collapsible suction devices being positioned within the plurality of cavities.

An advantage of an exemplary embodiment of the present disclosure includes decreased contamination of comestibles by reducing human contact with the comestibles.

Another advantage of an exemplary embodiment of the present disclosure includes increased consistency of comestibles by reducing contact with substantially planar surfaces, by reducing contact with prongs, by permitting a shaped body, or a combination thereof to be used before, during, or after packaging and/or cooking of the comestible product.

Another advantage of an exemplary embodiment of the present disclosure includes desirable deforming of the pliant comestibles by including a recess portion in the tool body and/or by including features for bending or shaping of the pliant comestible in the tool.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Provided is a tool and process for handling pliant comestibles capable of handling the pliant comestibles without damaging the product. Embodiments of the present disclosure can decrease contamination of comestibles by reducing human contact with the comestibles. Embodiments of the present disclosure can increase consistency of comestibles by reducing contact with substantially planar surfaces, by reducing contact with prongs, by permitting a shaped body to be used before, during, or after packaging and/or cooking of the comestible product. Embodiments of the present disclosure can desirably deform pliant comestibles by including a recessed portion in the tool body and/or by including features for bending or shaping of the pliant comestible in the tool.

Figure 1:
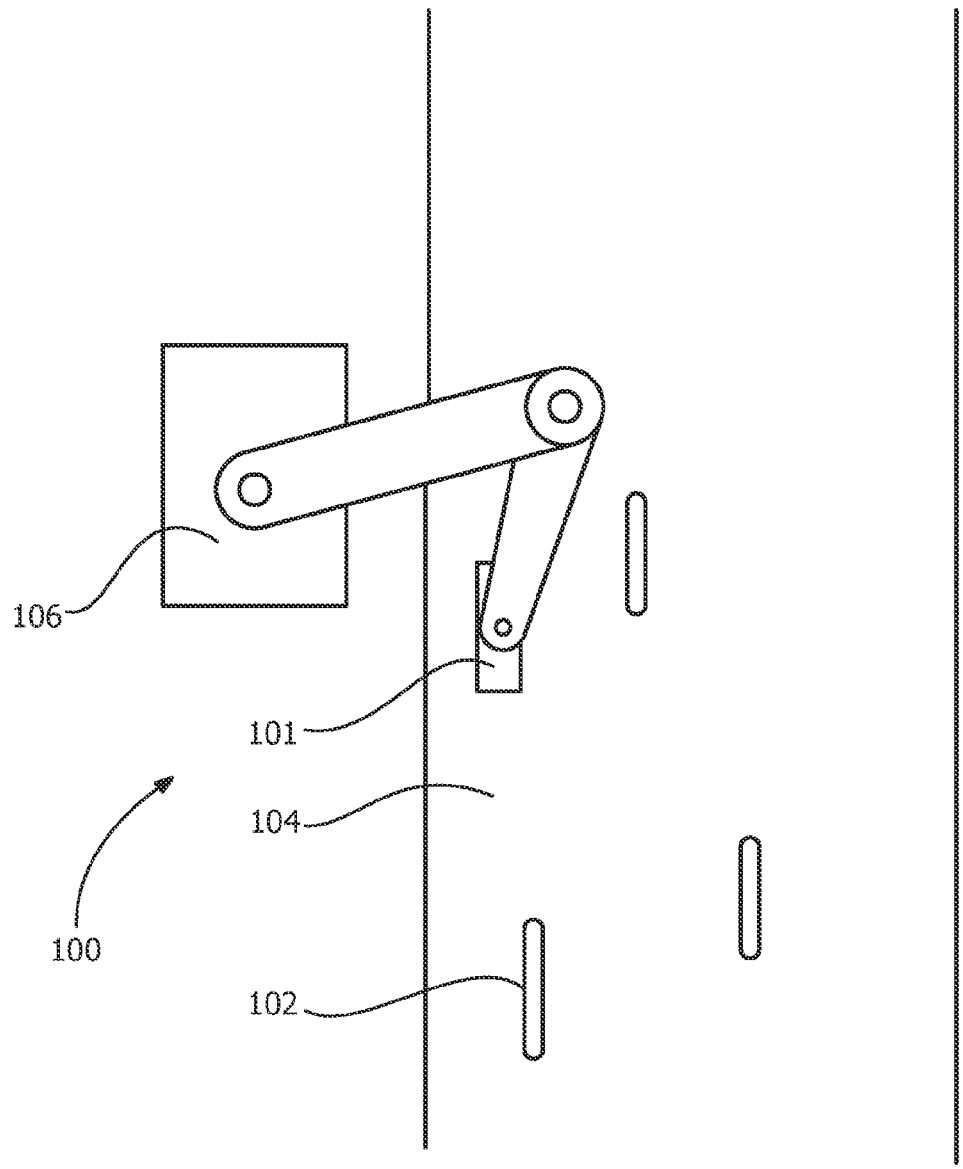
FIG. 1 shows a top view of an exemplary embodiment of a system having a tool for handling pliant comestibles according to the disclosure.
Figure 2:
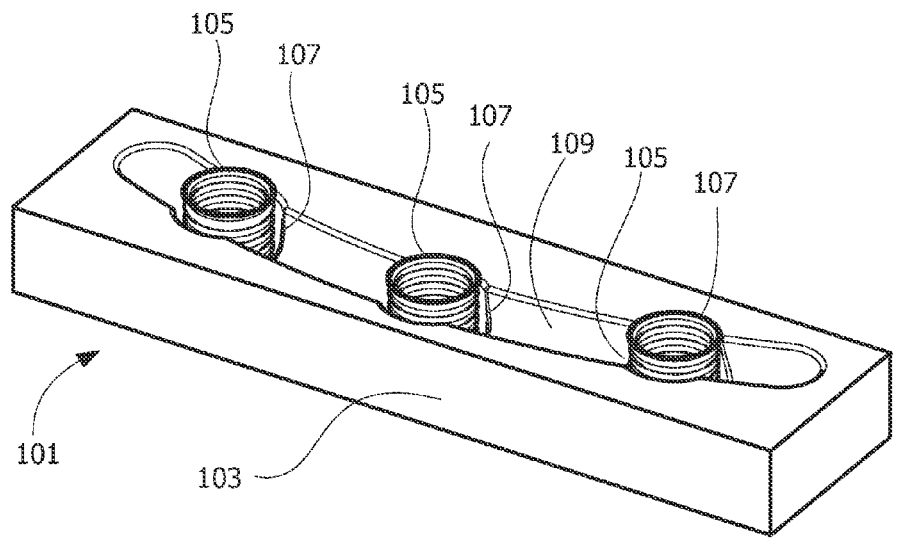
FIG. 2 shows a perspective view of an exemplary embodiment of a tool having a plurality of collapsible suction devices with substantially identical orientations according to the disclosure.

FIGS. 1-2 show an exemplary tool 101 for handling a pliant comestible. FIG. 1 shows the tool 101 in a system 100 having comestibles 102 on a conveyor belt 104. The tool 101 is secured to a picker system 106 capable of lifting, repositioning, and releasing the comestible 102. The picker system 106 can be part of a robotic process for handling comestibles. For example, the tool 101 can be attached to a robotic arm in the system such that the comestible 102 is lifted, repositioned, and released. The comestible 102 is a pliant comestible. As used herein, the term "pliant" refers to being capable of discernible flexible movement. Exemplary pliant comestibles include, but are not limited to, wieners, frankfurters, hot dogs, sausages, pickles, cheeses, or any other suitable foodstuffs. In one embodiment, the pliant comestible is a substantially cylindrical product. In another embodiment, the pliant comestible is elongate.

Referring to FIG. 2, the tool 101 includes a tool body 103 and a plurality of collapsible suction devices 105. The tool body 103 includes a geometry that conforms to the pliant comestible positioned by the tool 101. The tool body 103 includes a recessed mold 109 and a plurality of cavities 107, the plurality of collapsible suction devices 105 being positioned within the plurality of cavities 107. The tool 103 can be formed of any suitable material or materials safe for handling comestibles. In one embodiment, the tool body 103 is formed of a semi-crystalline material that absorbs very little moisture, such as homopolymer acetal. In one embodiment, the collapsible suction devices 105 may be formed of silicone or a similar flexible or semi-flexible polymer.

Figure 3:
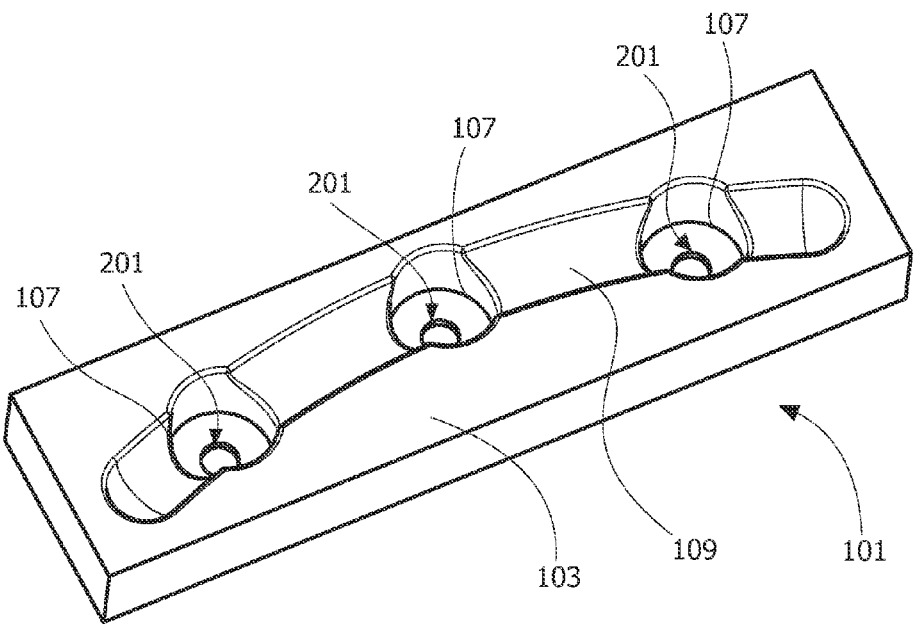
FIG. 3 shows a perspective view of an exemplary embodiment of a tool having a plurality of cavities with substantially identical orientations according to the disclosure.

The pliant comestible can be lifted with the collapsible suction devices 105 upon the plurality of collapsible suction devices 105 being collapsed into the plurality of cavities 107 of the tool body 103. The collapsing of the collapsible suction devices 105 positions the pliant comestible into the recessed mold 109 of the tool body 103 by a negative pressure being applied from the plurality of cavities 107. For example, as shown in FIG. 3, which shows an exemplary embodiment of the tool 101 without the collapsible suction devices 105, the cavities 107 can include air paths 201 permitting a vacuum (not shown) to draw air through the cavities 107. Referring again to FIG. 2, when an air-tight seal is formed between the collapsible suction devices 105 and the cavities 107, air is drawn through the collapsible suction devices 105.

The positioning of the pliant comestible is performed by the negative pressure drawing air through the collapsible suction devices 105. Upon the pliant comestible being drawn to contact the collapsible suction devices 105, the negative pressure draws the pliant comestible into the recessed mold 109 while collapsing the collapsible suction devices 105. In one embodiment, the collapsible suction devices 105 can be tubes fitting into the cavities 107, thereby accommodating the shape and size of the pliant comestible. The depth of the recessed mold 109 and/or the plurality of cavities 107 can precisely, consistently, quickly, or some combination thereof, position the pliant comestible. In one embodiment, the collapsible suction devices 105 expand from a collapsed position in the absence or reduction of the negative pressure. In this embodiment, the collapsible suction devices 105 force the pliant comestible out of the tool 101.

The collapsible suction devices 105 can be secured within the cavities 107 by any suitable mechanism. For example, the collapsible suction devices 105 can be secured within the cavities by an adhesive, a threaded engagement feature, a friction fit, any other suitable securing mechanism, or any combination thereof. The collapsible suction devices 105 can be permanently or temporarily secured to the cavities 107. It is desirable for the collapsible suction devices 105 to form substantially air-tight contact with the cavities 107.

As shown in FIG. 2, the collapsible suction devices 105 can include or consist of three devices. The collapsible suction devices 105 can be arranged within the recessed mold 109 such that they do not form a line. For example, the recessed mold 109 can be arched or bent having the collapsible suction devices 105 arranged in an arch or bend. The recessed mold 109 can have a different shape from the tool body 103. For example, as shown in FIG. 2, the recessed mold 109 can be arched and the tool body 103 can be rectangular. Alternatively, the geometry of the recessed mold 109 can be straight having the collapsible suction devices 105 arranged in a line, circular having the plurality of collapsible suction devices arranged in a circle, oval, or other suitable geometry, based on the comestible product to be handled. Additionally or alternatively, the orientation of the collapsible suction devices 105 can be substantially identical. For example, the collapsible suction devices 105 can all extend in an orientation substantially perpendicular to the orientation of the recessed mold 109 when the recessed mold 109 extends along the tool body 103.

Figure 4:
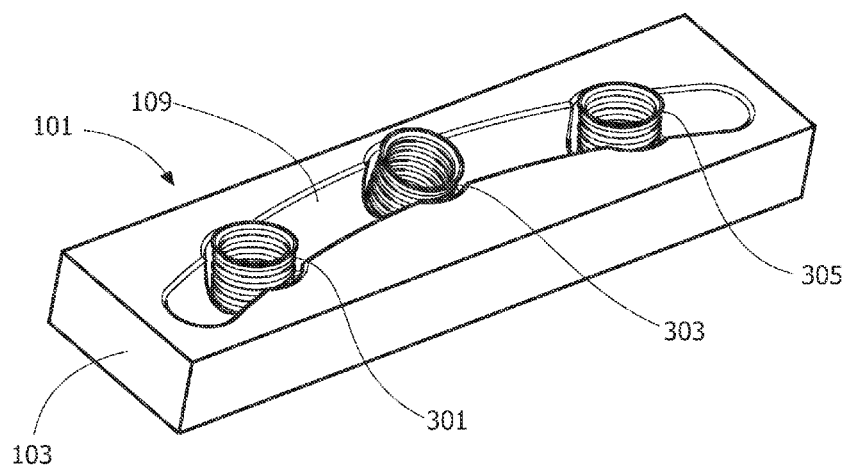
FIG. 4 shows a perspective view of an exemplary embodiment of a tool having a plurality of collapsible suction devices with multiple orientations according to the disclosure.

FIG. 4 shows the tool 101 for handling the pliant comestible having collapsible suction devices 105 that do not all have substantially identical orientations. For example, the tool 101 shown in FIG. 4 shows a first collapsible suction device 301, a second collapsible suction device 303, and a third collapsible suction device 305. The first collapsible suction device 301 is positioned with a first orientation, the second collapsible suction device 303 is positioned with a second orientation, and the third collapsible suction device 305 is positioned with a third orientation. The first orientation differs from the second orientation and the first orientation is substantially identical to the third orientation. The difference between the first orientation and the second orientation is configured to bend the pliant comestible. The differing orientations of the collapsible suction devices 105 can correspond to differing orientations of the cavities 107. In this embodiment, the negative pressure draws air through the collapsible suction devices 105 at an angle (in comparison to each other) to facilitate the bending or forming of the pliant comestible. In one embodiment, the pressure differential varies between the collapsible suction devices 105, thereby permitting additional stability for positioning and repositioning.

Figure 5:
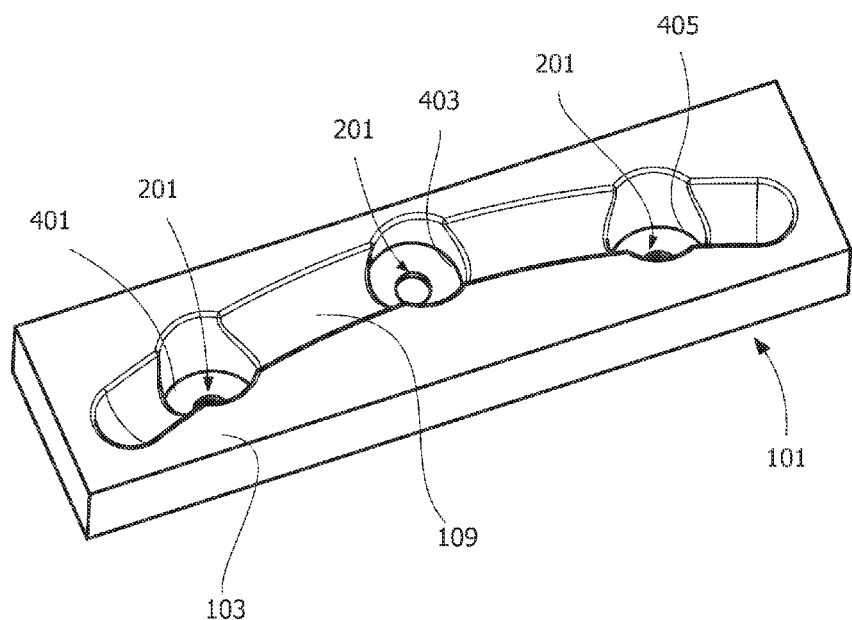
FIG. 5 shows a perspective view of an exemplary embodiment of a tool having a plurality of cavities with multiple orientations according to the disclosure.

In one embodiment, as shown in FIG. 5, the tool 101 can include a first cavity 401, a second cavity 403, and a third cavity 405. The cavity 401 is positioned with a first orientation, the second cavity 403 is positioned with a second orientation, and the third cavity 405 is positioned with a third orientation. The first orientation differs from the second orientation and the first orientation is substantially identical to the third orientation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A tool for handling a pliant comestible, comprising:
   a tool body comprising a recessed mold and a plurality of cavities;
   a plurality of collapsible suction devices configured to be positioned within the plurality of cavities, the plurality of collapsible suction devices including a flexible tube being configured to collapse into the plurality of cavities when negative pressure is applied from the plurality of cavities and to expand when negative pressure is released from the plurality of cavities;
   wherein the plurality of collapsible suction devices are configured to lift the pliant comestible from the recessed mold when expanded and position the pliant comestible within the recessed mold when collapsed.

2. The tool of claim 1, wherein the plurality of collapsible suction devices is configured to collapse upon a negative pressure being applied from the plurality of cavities.

3. The tool of claim 1, wherein the plurality of collapsible suction devices is expanded upon reduction of the negative pressure applied from the plurality of cavities.

4. The tool of claim 1, wherein the plurality of collapsible suction devices comprises a first collapsible suction device, a second collapsible suction device, and a third collapsible suction device.

5. The tool of claim 4, wherein the first collapsible suction device, the second collapsible suction device, and the third collapsible suction device are positioned with substantially identical orientations.

6. The tool of claim 4, wherein the first collapsible suction device is positioned with a first orientation, the second collapsible suction device is positioned with a second orientation, and the third collapsible suction device is positioned with a third orientation, the first orientation differing from the second orientation and the first orientation being substantially identical to the third orientation.

7. The tool of claim 6, wherein the difference between the first orientation and the second orientation is configured to bend the pliant comestible.

8. The tool of claim 1, wherein the pliant comestible is elongate.

9. The tool of claim 1, wherein the pliant comestible is substantially cylindrical.

10. The tool of claim 1, wherein the recessed mold extends along the tool body.

11. The tool of claim 10, wherein the plurality of collapsible suction devices are positioned substantially perpendicularly to the recessed mold.

12. A tool for handling a pliant comestible, comprising:
   a tool body comprising a recessed mold and a plurality of cavities;
   a plurality of collapsible suction devices configured to be positioned within the plurality of cavities, the plurality of collapsible suction devices including a first collapsible suction device, a second collapsible suction device, and a third collapsible suction device;
   wherein the first collapsible suction device is positioned with a first orientation, the second collapsible suction device is positioned with a second orientation, and the third collapsible suction device is positioned with a third orientation, the first orientation differing from the second orientation and the first orientation being substantially identical to the third orientation;
   wherein the plurality of collapsible suction devices are configured to lift the pliant comestible, collapse into the plurality of cavities, and position the pliant comestible within the recessed mold.

13. The tool of claim 12, wherein the pliant comestible is elongate.

14. The tool of claim 12, wherein the pliant comestible is substantially cylindrical.

15. The tool of claim 12, wherein the recessed mold extends along the tool body.

16. A tool for handling a pliant comestible, comprising:
   a tool body comprising a recessed mold and a plurality of cavities;
   a plurality of collapsible suction devices configured to be positioned within the plurality of cavities, wherein the plurality of collapsible suction devices comprises a first collapsible suction device, a second collapsible suction device, and a third collapsible suction device;
   wherein the first collapsible suction device is positioned with a first orientation, the second collapsible suction device is positioned with a second orientation, and the third collapsible suction device is positioned with a third orientation, the first orientation differing from the second orientation and the first orientation being substantially identical to the third orientation;
   wherein the difference between the first orientation and the second orientation is configured to bend the pliant comestible;
   wherein the plurality of collapsible suction devices are configured to lift the pliant comestible, collapse into the plurality of cavities, and position the pliant comestible within the recessed mold.

* * * * *